Figure 1:
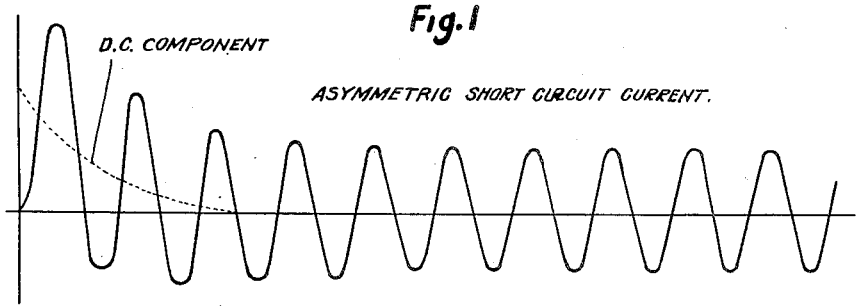

Sept. 19, 1933.    J. G. FALLOU    1,927,794
DIFFERENTIAL PROTECTION FOR ELECTRIC APPARATUS
Filed Sept. 2, 1930    2 Sheets-Sheet 1

Inventor:
Jean Gustave Fallou,
by Charles E. Tullar
His Attorney.

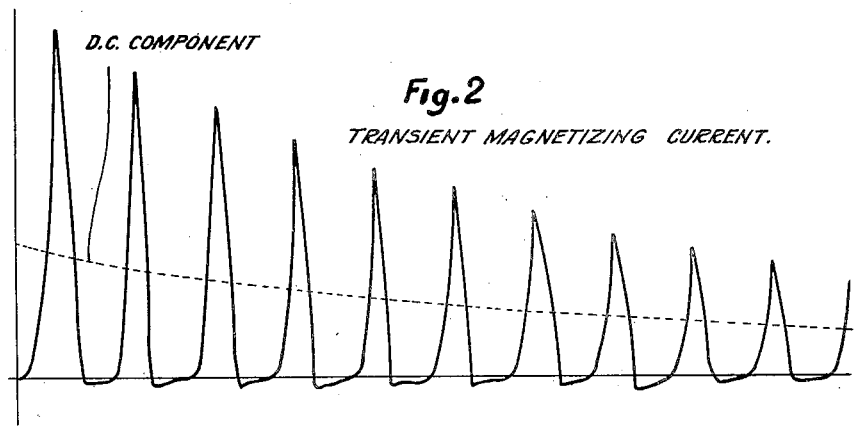
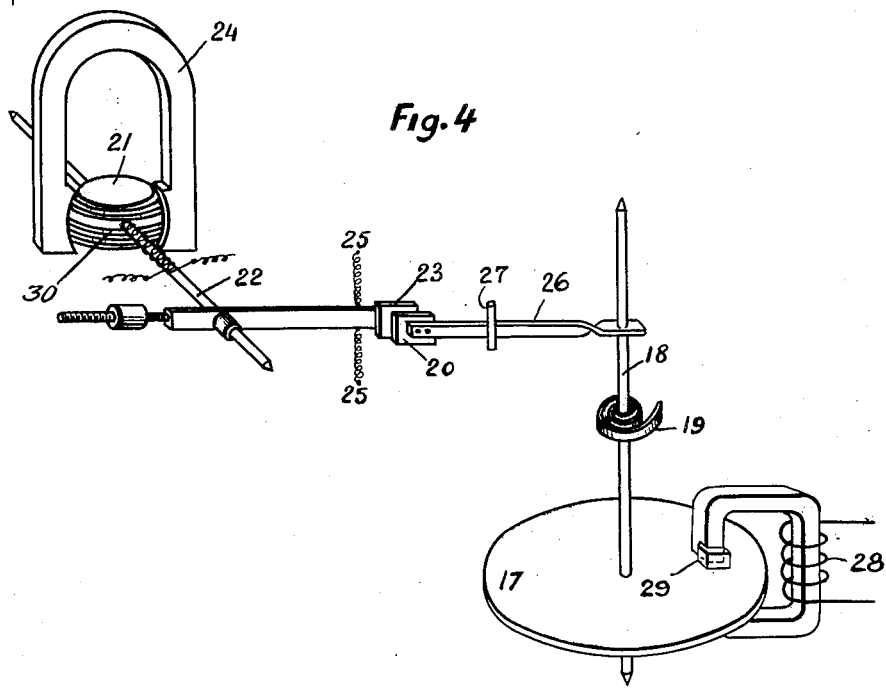

Patented Sept. 19, 1933

1,927,794

UNITED STATES PATENT OFFICE 1,927,794

DIFFERENTIAL PROTECTION FOR ELECTRIC APPARATUS

Jean Gustave Fallou, Paris, France, assignor to General Electric Co., Schenectady, N. Y., a corporation of New York Application September 2, 1930, Serial No. 479,408, and in France September 9, 1929

16 Claims. (Cl. 175—294)

Electric apparatus is often protected against short-circuits by means of a differential system the principle of which is well known. It comprises at the input and output ends of the windings current transformers whose transformation ratios are such that they normally provide equal currents, as when the apparatus works at full load.

The secondaries of these current transformers are connected in series and between two points of these connections the potentials of which are equal, there is connected a current relay which is thus fed by a current proportional to the difference between the currents entering and passing out of the apparatus to be protected.

When the apparatus thus protected has an internal fault, there flows through the relay a current which closes its contacts and consequently opens the switches disposed on either side of the protected apparatus.

When there is no internal fault in the protected apparatus, the difference between the currents feeding the relay is zero or at the most equal to the magnetizing current if the apparatus obtains its excitation from the line. It is therefore necessary to give the relay a sufficiently low sensitivity to insure that it does not operate under the action of the magnetizing current. Under normal operating conditions this magnetizing current is only a small fraction of the normal current and the extent of the lack of sensivity is not detrimental to the operation.

But the matter is rendered difficult by the fact that when one of the windings of the transformer or the like apparatus is connected to the line, the magnetizing current is liable to have a considerable temporary value which, although of a transient character, has a very slow decrement and requires some time to disappear, for example several seconds in the case of large apparatus. It is consequently necessary either to render the relay inoperative during the first seconds following the closing of the circuit or to give it a certain time lag. The systematic inoperativeness of the relay at the moment of the closing of the circuit has obviously as a consequence to suppress the protection of the apparatus during this period. On the other hand, the systematic time lag in the relay has the drawback of delaying in all cases the opening of the switches and of increasing thereby the stress to which the line is subjected and the destructive effects of the short-circuit.

My invention has for its object a simple device adapted to render the differential relay non-sensitive or inoperative in the case where the intensity of the current passing through it is due solely to the temporary conditions arising through the establishment of the magnetizing current and only in this case.

My invention makes use of the particular shape of the curve corresponding to this temporary extra current on circuit closure whereby it differs from ordinary short-circuit currents.

Short-circuit currents have the shape of alternating currents. These short-circuit currents may initially be asymmetric, that is a continuous component may be sometimes superposed thereon at the start, but is speedily damped. Consequently it may be stated that a few cycles after their occurrence, the mean value of an integral number of whole cycles of these short-circuit currents is zero, that is the D. C. component has disappeared. Fig. 1 shows diagrammatically such a current, the dotted line indicating the D. C. component.

On the contrary the temporary conditions which cause the magnetizing or idle current provide a current constituted always by the superposition of a direct and an alternating current, the two currents having the same time constant for their damping. It is thus apparent that during the long temporary time which is detrimental to the proper working of the differential protection, the current flowing through the relay has a mean value different from zero, that is the D. C. component is present throughout the duration of the transient condition. Fig. 2 shows diagrammatically the curve of the magnetizing current in a transformer on the connection of one of its windings to a live circuit, the dotted line indicating the D. C. component or curve of mean values.

My invention consists in disposing in the same circuit as the differential alternating current relay which is sensitive to the virtual or effective value of the currents passing through it, a second relay which is sensitive only to their mean value. When this second relay is operative it renders the differential relay non-sensitive or inoperative either through electric or mechanical contrivances.

My invention will be better understood from the following description when considered in connection with the accompanying drawings and its scope will be pointed out in the appended claims.

In the accompanying drawings, Fig. 1 shows a curve or wave form corresponding to a short-circuit current; Fig. 2 shows a curve or wave form corresponding to the idle or transient magnetizing current during the temporary conditions prevailing on closure of the circuit of a winding of apparatus having a magnetic metal circuit; and Figs. 3 and 4 illustrate diagrammatically by way of example two different embodiments of my invention.

Figure 3:
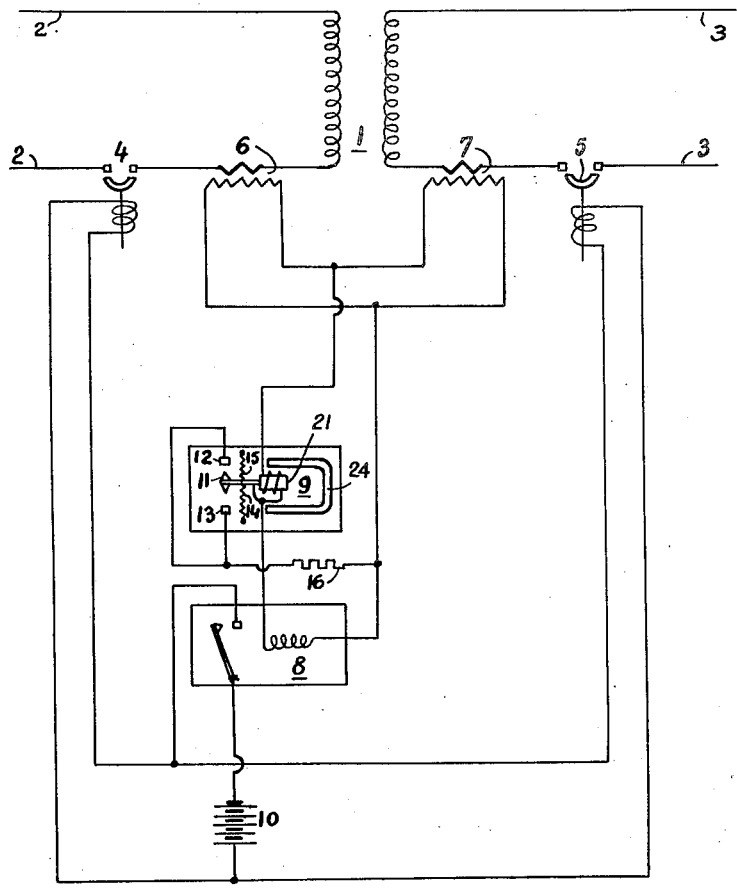

Fig. 3 shows at 1 the apparatus to be protected (a transformer in the case illustrated). This is shown single-phase for sake of simplicity. It is connected with the circuits 2 and 3 through the switches 4 and 5. Current transformers 6 and 7 inserted in these circuits have their secondaries connected in series. In parallel therewith are connected the differential alternating current relay 8 and a relay 9 which is sensitive only to the mean value of the current passing through it, that is the D. C. component of any pulsating current flowing in the circuit in which the relay is connected. This relay may be a polarized or direct current relay including for example a movable frame 21 disposed in the gap of an electromagnet or of a permanent magnet 24.

The closing of the contacts of the relay 8 causes the control coils of the switches or cutouts 4 and 5 to be fed by the local battery 10. When the mean current in the relay 9 is zero, its movable contact 11 is held in its inoperative position by the opposing springs 14 and 15. When the mean current in the relay 9 has a sufficient value, the movable contact 11 comes against one of the stationary contacts 12 or 13 according to the polarity of the current, so as to parallel the coil of the relay 8 with the resistance 16. It is apparent that as long as the currents passing out of the current transformers 6 and 7 are equal, no current passes through the relays 8 and 9 and the switches or interrupters 4 and 5 remain closed.

When a short circuit is produced inside the apparatus 1, an alternating current the mean value of which is substantially zero passes through the relays 8 and 9. Consequently the relay 9 does not respond to close its contacts and the relay 8 retains its entire sensitivity and closes its contacts.

On the contrary when the transformer 1 is energized through the closing of one of the switches 4 or 5, the other remaining open, an idle or magnetizing inrush current is caused to pass through the transformer 1 whereby an excessive current passes through the relays 8 and 9. But as the mean value of this current is not zero, the relay 9 closes its contacts and renders the relay 8 non-sensitive.

Fig. 4 shows a modification of my invention wherein the polarized relay acts mechanically in the operation of the differential or alternating current relay, the two relays forming a single device.

The differential or alternating current relay comprises a disc 17 secured to a vertical spindle 18. The latter when rotating carries along with it a contact 20 mounted on a horizontal rod or arm 26. A biasing spring 19 holds the arrangement in its inoperative or reset position, against the stop 27 for example, as long as the current is zero in the windings 28 and 29 of the relay. The polarized relay comprises a frame 21 disposed in the gap of a permanent magnet 24 and secured to a horizontal spindle 22. When the latter rotates, it causes the contact 23 to rotate in a vertical plane. An arrangement of opposing springs 25 holds the device in its position of rest when the mean current in the winding 30 of the polarized relay is zero. For this rest position the contact 23 is in the same horizontal plane as the contact 20 of the alternating current relay.

It is apparent that when no current passes through the relays, that is when the input and output currents of the apparatus to be protected are equal, the contacts 20 and 23 face each other but are held apart through the agency of the spring 19. If there is an internal short circuit in the transformer or other apparatus with which the relay may be associated, the disc 17 rotates, but the frame 21 remains stationary and the contact 20 comes against the contact 23 thereby closing the circuit controlling the switches.

On the contrary if the current passing through the relay is the temporary or magnetizing inrush current of apparatus subject to such currents on their energization, the disc 17 and the frame 21 rotate simultaneously but the contact 23 moves out of the path of the contact 20, thus preventing the switch-control circuit from being closed.

Obviously the arrangements and applications described herein by way of example are by no means limitative and may be widely modified within the scope of my invention as sought to be covered by the appended claims.

What I claim as new and desire to secure by Letters Patent of the United States is:

1. A protective system for an electric apparatus comprising input and output circuits for the apparatus to be protected, a primary winding in each circuit, secondary windings cooperating with said primary windings, an auxiliary circuit wherein said secondaries are connected in series, a normally inoperative current relay connected across the auxiliary circuit, means whereby said relay when excited disconnects the apparatus to be protected, a second normally inoperative relay sensitive to the mean value of the current passing through it connected across the auxiliary circuit and means whereby the second relay when excited prevents the operation of said current relay.

2. A protective system for an electric apparatus comprising input and output circuits for the apparatus to be protected, a primary winding in each circuit, secondary windings cooperating with said primary windings, an auxiliary circuit wherein said secondaries are connected in series, a current relay and a polarized relay connected in series across the auxiliary circuit in a manner such as to be both normally inoperative, means whereby the current relay when excited disconnects the apparatus to be protected and means whereby the polarized relay when excited prevents the operation of the current relay.

3. A protective system for an electric apparatus comprising input and output circuits for the apparatus to be protected, a primary winding in each circuit, secondary windings cooperating with said primary windings, an auxiliary circuit wherein said secondaries are connected in series, a normally inoperative current relay connected across the auxiliary circuit, means whereby said relay when excited disconnects the apparatus to be protected, a second normally inoperative relay sensitive to the mean value of the current passing through it connected across the auxiliary circuit, a resistance adapted to shunt the current relay and means controlled by the second relay for connecting said resistance across the current relay.

4. A protective system for an electric apparatus comprising input and output circuits for the apparatus to be protected, a primary winding in each circuit, secondary windings cooperating with said primary windings, an auxiliary circuit wherein said secondaries are connected in series, a normally inoperative current relay connected across the auxiliary circuit, means whereby said relay when excited disconnects the apparatus to be protected, a second normally inoperative relay sensitive to the mean value of the current passing through it connected across the auxiliary circuit, a control circuit for controlling the supplying of current to the apparatus to be protected, means whereby the current relay controls said control circuit and means controlled by the second relay for preventing the operation of said last mentioned means.

5. A protective system for an electric apparatus comprising input and output circuits for the apparatus to be protected, a primary winding in each circuit, secondary windings cooperating with said primary windings, an auxiliary circuit wherein said secondaries are connected in series, a normally inoperative current relay connected across the auxiliary circuit, means whereby said relay when excited disconnects the apparatus to be protected, a second normally inoperative relay sensitive to the mean value of the current passing through it connected across the auxiliary circuit, a control circuit for controlling the supplying of current to the apparatus to be protected, two cooperating contacts normally spaced apart in said control circuit, means controlled by the current relay for causing engagement of said contacts and means controlled by the second relay for preventing the engagement of said contacts.

6. A protective system for an electric apparatus comprising input and output circuits for the apparatus to be protected, a primary winding in each circuit, secondary windings cooperating with said primary windings, an auxiliary circuit wherein said secondaries are connected in series, a normally inoperative current relay connected across the auxiliary circuit, means whereby said relay when excited disconnects the apparatus to be protected, a second normally inoperative relay sensitive to the mean value of the current passing through it connected across the auxiliary circuit, a control circuit for controlling the supplying of current to the apparatus to be protected, two cooperating contacts in said control circuit, means whereby the two relays cause the corresponding contacts to rotate in planes perpendicular to each other, the normal position of the contact controlled by the second relay being substantially in the plane of rotation of the other contact whereby the current relay can bring the contact it controls against the other contact only while said other contact remains in the plane of rotation of the contact controlled by the current relay.

7. In combination with electric apparatus having a winding subject to transient magnetizing currents, means for controlling the circuit of said apparatus including electroresponsive means connected to operate on the occurrence of a fault in said apparatus and means responsive to the direct current component of the transient magentizing current of said apparatus for controlling the operation of said electroresponsive means.

8. In combination with alternating current electric apparatus having a winding subject to transient magnetizing currents, means for controlling the circuit of said apparatus including means responsive to alternating current connected to be energized from the circuit of said apparatus and means responsive to uni-directional current for controlling the operation of said alternating current responsive means connected to be energized from the circuit of said apparatus.

9. In combination with alternating current electric apparatus having a winding subject to transient magnetizing currents, a circuit interrupter for controlling the circuit of said apparatus, an alternating current relay connected to respond to abnormal current conditions in the circuit of said apparatus for controlling said interrupter and a direct current relay connected to be energized from the circuit of said apparatus for preventing said alternating current relay from effecting the operation of said circuit interrupter on the occurrence of transient magnetizing current.

10. In combination with electric apparatus having a winding subject to transient magnetizing currents, means for controlling the circuit of said apparatus including a device connected to be energized in accordance with the difference between the current input and the current output of said apparatus and means responsive to unidirectional current for controlling the sensitivity of said device on the occurrence of transient magnetizing current connected to be energized in accordance with said current difference.

11. In combination with electric apparatus having a winding subject to transient magnetizing currents, means for controlling the circuit of said apparatus including a device connected to be energized in accordance with the difference between the current input and the current output of said apparatus and means responsive only to unidirectional current for controlling said device to prevent the operation thereof on the occurrence of transient magnetizing current connected to be energized in accordance with said current difference.

12. In combination with electric apparatus having a winding subject to transient magnetizing currents, relay means for controlling the circuit of said apparatus including two windings connected to be energized in accordance with the difference between the current input and the current output of said apparatus and means associated with one of said two windings for rendering the winding effectively operative only in response to a unidirectional current to control the operation of said relay means.

13. In combination with electric apparatus having a winding subject to transient magnetizing currents, an auxiliary circuit connected to be energized in accordance with the current input and the current output of said apparatus, relay means for controlling the circuit of said apparatus including two windings connected across said auxiliary circuit and means associated with one of said windings for rendering the winding effectively operative only in response to uni-directional current to control the operation of said relay means.

14. In combination with alternating current electric apparatus having a winding subject to transient magnetizing currents, circuit interrupting means for controlling the circuit of said apparatus, means for controlling the operation of said circuit interrupting means including means responsive to alternating current connected to be energized from the circuit of said apparatus and means responsive to the asymmetrical component of the transient magnetizing current of said apparatus for preventing said alternating current responsive means from effecting the operation of said circuit interrupting means on the occurrence of transient magnetizing current.

15. In combination with electric apparatus having a winding subject to transient magnetizing currents, circuit interrupting means for controlling the circuit of said apparatus, means for controlling the operation of said circuit interrupting means including an auxiliary circuit connected to be energized in accordance with the current input and the current output of said apparatus, relay means for controlling the operation of said circuit interrupting means including two windings connected across said auxiliary circuit and means associated with one of said two windings for rendering the winding effectively operative only in response to uni-directional current to prevent the operation of said circuit interrupting means by said relay means on the occurrence of transient magnetizing current.

16. In combination with electric apparatus having a winding subject to transient magnetizing currents, means for controlling the circuit of said apparatus and means responsive to the asymmetrical component of the transient magnetizing current of said apparatus for preventing the operation of said circuit controlling means.

JEAN GUSTAVE FALLOU.